`US007926056B2`

(12) United States Patent
Lier et al.

(10) Patent No.: US 7,926,056 B2
(45) Date of Patent: *Apr. 12, 2011

(54) METHOD FOR EFFECTING A SOFTWARE SERVICE IN A SYSTEM OF A SOFTWARE SYSTEM LANDSCAPE AND COMPUTER SYSTEM

(75) Inventors: Karlheinz Lier, Rauenberg (DE);
 Volker Schulz, Heppenheim (DE);
 Wolfram Nogge, Mannehim (DE)

(73) Assignee: SAP AG, Walldorf (DE)

( * ) Notice: Subject to any disclaimer, the term of this patent is extended or adjusted under 35 U.S.C. 154(b) by 1564 days.

This patent is subject to a terminal disclaimer.

(21) Appl. No.: 11/262,326

(22) Filed: Oct. 27, 2005

(65) Prior Publication Data
US 2006/0143614 A1  Jun. 29, 2006

(30) Foreign Application Priority Data

Oct. 27, 2004  (EP) .................................... 04025502

(51) Int. Cl.
 *G06F 9/46* (2006.01)
 *G06F 9/44* (2006.01)
 *G06F 9/445* (2006.01)

(52) U.S. Cl. ........ 718/102; 717/172; 717/173; 717/177; 717/178

(58) Field of Classification Search .................. 718/102; 717/177

See application file for complete search history.

(56) References Cited

U.S. PATENT DOCUMENTS

| 5,237,688 | A | * | 8/1993 | Calvert et al. ................. 717/121 |
| 5,495,610 | A | | 2/1996 | Shing et al. |
| 5,608,721 | A | | 3/1997 | Natarajan et al. |

(Continued)

FOREIGN PATENT DOCUMENTS

JP  2001265603  9/2001

(Continued)

OTHER PUBLICATIONS

Bawtree, Hugh , "A tool for managing change; Software Development", XP-002321302, (Aug. 2000),18 pgs.

(Continued)

*Primary Examiner* — Emerson C Puente
*Assistant Examiner* — Camquy Truong
(74) *Attorney, Agent, or Firm* — Schwegman, Lundberg & Woessner P.A.

(57) ABSTRACT

The invention concerns a method for effecting a software service in at least one of a plurality of logical systems of a software system landscape, wherein the logical systems are interconnected by logical transport paths, each logical system has associated therewith one of a plurality of system roles and the software service relates to at least one of the code and the data of the at least one system, is described. The method includes providing a transport track that defines a route for software services through logical systems in a particular order and specifies one source system, adjacent interconnected systems, and at least one target system; generating a task list in a central task system from the transport track and the system roles, the task list defining tasks for routing a software service from a starting system to the at least one system and for implementing the preliminary software service in the at least one system; and scheduling in a central control system the execution of the tasks stored in the central task system and monitoring task statuses from the central control system.

10 Claims, 5 Drawing Sheets

U.S. PATENT DOCUMENTS

| | | | |
|---|---|---|---|
| 5,745,767 | A | 4/1998 | Rosen et al. |
| 5,845,090 | A | 12/1998 | Collins, III et al. |
| 5,859,977 | A | 1/1999 | Nishiyama et al. |
| 5,860,007 | A | 1/1999 | Soni et al. |
| 5,953,533 | A | 9/1999 | Fink et al. |
| 6,110,228 | A | 8/2000 | Albright et al. |
| 6,263,358 | B1 | 7/2001 | Lee et al. |
| 6,308,173 | B1 | 10/2001 | Glasser et al. |
| 6,513,132 | B1 | 1/2003 | Suzuki |
| 7,020,690 | B1 | 3/2006 | Haitsuka et al. |
| 7,107,331 | B2 | 9/2006 | Gava et al. |
| 7,721,257 | B2 | 5/2010 | Demuth et al. |
| 7,725,891 | B2 | 5/2010 | Demuth et al. |
| 2001/0052074 | A1 | 12/2001 | Pensak et al. |
| 2002/0026592 | A1 | 2/2002 | Gavrila et al. |
| 2002/0103851 | A1 | 8/2002 | Kikinis |
| 2002/0129356 | A1* | 9/2002 | Hellerstein et al. ........... 717/177 |
| 2002/0156798 | A1 | 10/2002 | Larue et al. |
| 2002/0169878 | A1 | 11/2002 | Orenshteyn |
| 2002/0174164 | A1 | 11/2002 | Hayashi |
| 2002/0184398 | A1 | 12/2002 | Orenshteyn |
| 2002/0198725 | A1 | 12/2002 | Piepenbrink et al. |
| 2003/0040974 | A1 | 2/2003 | Chauvin et al. |
| 2003/0084350 | A1 | 5/2003 | Eibach et al. |
| 2003/0093516 | A1 | 5/2003 | Parsons et al. |
| 2003/0142627 | A1 | 7/2003 | Chiu et al. |
| 2004/0010708 | A1 | 1/2004 | Johnson et al. |
| 2004/0060044 | A1 | 3/2004 | Das et al. |
| 2004/0081183 | A1 | 4/2004 | Monza et al. |
| 2004/0117795 | A1 | 6/2004 | Wang et al. |
| 2004/0143811 | A1* | 7/2004 | Kaelicke et al. .............. 717/101 |
| 2004/0267935 | A1 | 12/2004 | Patiejunas |
| 2005/0080888 | A1 | 4/2005 | Walter |
| 2005/0209732 | A1 | 9/2005 | Audimoolam et al. |
| 2005/0210501 | A1 | 9/2005 | Zigmond et al. |
| 2006/0080653 | A1* | 4/2006 | Siwatu et al. ................. 717/173 |
| 2006/0112189 | A1 | 5/2006 | Demuth et al. |
| 2006/0117311 | A1 | 6/2006 | Demuth et al. |
| 2006/0123392 | A1 | 6/2006 | Demuth et al. |
| 2006/0123407 | A1 | 6/2006 | Demuth et al. |
| 2006/0149813 | A1 | 7/2006 | Janik |
| 2006/0155832 | A1 | 7/2006 | Demuth et al. |
| 2006/0164257 | A1 | 7/2006 | Giubbini |
| 2006/0203812 | A1 | 9/2006 | Demuth et al. |
| 2007/0038610 | A1 | 2/2007 | Omoigui |
| 2008/0183840 | A1 | 7/2008 | Khedouri et al. |

FOREIGN PATENT DOCUMENTS

| | | |
|---|---|---|
| WO | WO0163482 | 8/2001 |
| WO | WO-03060718 A1 | 7/2003 |

OTHER PUBLICATIONS

Dabrowski, C , et al., "Understanding self healing in service discovery systems", XP-002323534, 6 pgs, 2002.

Hodgson, Alan , "Intel eBusiness Engineering Release Management and Application Landing", *XP-002321303 Intel Technology Journal, Q4*, (2000),1-9.

IBM Document Center, "Publication information", XP-2325608, (Observed Apr. 21, 2005),1 pg.

Szallies, Constantin , "On Using the Observer Design Pattern", XP-002323533, (Aug. 21, 1997),9 pgs.

"U.S. Appl. No. 11/261,816, Advisory Action mailed Jul. 28, 2009", 3 pgs.

"U.S. Appl. No. 11/261,816, Final Office Action mailed May 14, 2009", 11 pgs.

"U.S. Appl. No. 11/261,816, Non-Final Office Action mailed Dec. 30, 2008", 14 pgs.

"U.S. Appl. No. 11/261,816, Notice of Allowance mailed Sep. 28, 2009", 11 Pgs.

"U.S. Appl. No. 11/261,816, Response filed Mar. 18, 2009 to Non-Final Office Action mailed Dec. 30, 2008", 15 pgs.

"U.S. Appl. No. 11/261,816, Response filed Aug. 11, 2009 to Advisory Action mailed Jul. 28, 2009", 11 pgs.

"U.S. Appl. No. 11/261,816, Response filed Jul. 10, 2009 to Final Office Action mailed May 14, 2009", 12 pgs.

"U.S. Appl. No. 11/262,143, Non-Final Office Action mailed Oct. 8, 2009", 11 pgs.

"U.S. Appl. No. 11/262,343, Advisory Action mailed Jun. 30, 2009", 5 pgs.

"U.S. Appl. No. 11/262,343, Final Office Action mailed Apr. 27, 2009", 11 pgs.

"U.S. Appl. No. 11/262,343, Non-Final Office Action mailed Sep. 14, 2009", 16 Pgs.

"U.S. Appl. No. 11/262,343, Non-Final Office Action mailed Nov. 28, 2008", 16 pgs.

"U.S. Appl. No. 11/262,343, Response filed Jan. 30, 2009 to Non-Final Office Action mailed Nov. 28, 2008", 13 pgs.

"U.S. Appl. No. 11/262,343, Response filed Jun. 15, 2009 to Final Office Action mailed Apr. 27, 2009", 12 pgs.

"U.S. Appl. No. 11/262,442, Non-Final Office Action mailed Jan. 7, 2009", 16 pgs.

"U.S. Appl. No. 11/262,442, Non-Final Office Action mailed Aug. 31, 2009", 18 pgs.

"U.S. Appl. No. 11/262,442, Response filed Apr. 27, 2009 to Non Final Office Action mailed Jan. 7, 2009", 17 pgs.

"U.S. Appl. No. 11/262,543, Advisory Action mailed Jul. 1, 2009", 3 pgs.

"U.S. Appl. No. 11/262,543, Final Office Action mailed Apr. 27, 2009", 13 pgs.

"U.S. Appl. No. 11/262,543, Non-Final Office Action mailed Dec. 30, 2008", 11 pgs.

"U.S. Appl. No. 11/262,543, Notice of Allowance mailed Sep. 15, 2009", 10 Pgs.

"U.S. Appl. No. 11/262,543, Pre-Appeal Brief Request mailed Jul. 20, 2009", 5 pgs.

"U.S. Appl. No. 11/262,543, Response filed Mar. 9, 2009 to Non-Final Office Action mailed Dec. 30, 2008", 14 pgs.

"U.S. Appl. No. 11/262,543, Response filed Jun. 15, 2009 to Final Office Action mailed Apr. 27, 2009", 11 pgs.

IBM Corporation, "", *Tivoli software distribution users guide 4.1*, (636 pages) XP-002321301, 2005, Relevant pgs, as per Dr. Verhasselt—For matters 78EP04, 78EP05, 78EP06: pp. 251, 262, 407, 436, 439, 443. For matter 78EP07: pp. 5, 10, 11, 163, 176, 177; For matter 78EP10: pp. 1, 4, 12, 251, 252, 449, 450, 452, 577., (2001), 1, 4, 5, 10, 11, 12, 251, 252, 262, 407, 436, 439, 443, 449, 450, 452, 577.

IBM Corporation, "", *IBM Tivoli Configuration Manager—User's Guide for Software Distribution—Version 4.2*, XP-2325607, (Oct. 2002), 1-358.

Mcfarland Metzger, Sue S, "SAP R/3 change and transport management : the Official SAP guide / (SAP R3—Systemlandschaft Implementieren und warten)", XP-002325774, (Jan. 12, 2000), 419, 461, 465.

Schneider-Neureither, Andreas (ED), "SAP System Landscape Optimization", *SAP Press*, 2004, ISBN 1-59229-026-4, (2004), 73-78; 96-100.

"U.S. Appl. No. 11/261,816 Notice of Allowance mailed Jan. 12, 2010", 5 pgs.

"U.S. Appl. No. 11/262,043, Non-Final Office Action mailed Oct. 27, 2009", 11 Pgs.

"U.S. Appl. No. 11/262,043, Response filed Jan. 21, 2010 to Non Final Office Action mailed Oct. 27, 2009", 10 pgs.

"U.S. Appl. No. 11/262,143, Final Office Action mailed Mar. 25, 2010", 14 pgs.

"U.S. Appl. No. 11/262,143, Pre-Appeal Brief Request filed May 11, 2010", 5 pgs.

"U.S. Appl. No. 11/262,143, Response filed Dec. 11, 2009 to Non Final Office Action mailed Oct. 8, 2009", 14 pgs.

"U.S. Appl. No. 11/262,343, Examiner Interview Summary mailed Nov. 9, 2009", 3 pgs.

"U.S. Appl. No. 11/262,343, Final Office Action mailed Mar. 9, 2010", 16 pgs.

"U.S. Appl. No. 11/262,343, Pre-Appeal Brief Request filed Apr. 15, 2010", 5 pgs.

"U.S. Appl. No. 11/262,343, Response filed Dec. 4, 2009 to Non Final Office Action mailed Sep. 14, 2009", 12 pgs.

"U.S. Appl. No. 11/262,442, Final Office Action mailed Apr. 19, 2010", 8 pgs.

"U.S. Appl. No. 11/262,442, Response filed Jun. 9, 2010 to Final Office Action mailed Apr. 19, 2010", 16 pgs.

"U.S. Appl. No. 11/262,442, Response filed Nov. 18, 2009 to Non Final Office Action mailed Aug. 31, 2009", 13 pgs.

"U.S. Appl. No. 11/262,543, Notice of Allowance mailed Jan. 7, 2010", 5 pgs.

* cited by examiner

METHOD FOR EFFECTING A SOFTWARE SERVICE IN A SYSTEM OF A SOFTWARE SYSTEM LANDSCAPE AND COMPUTER SYSTEM

CLAIM OF PRIORITY

The present patent applicati on claims the priority benefit of the filing date of European Application (EPO) No. 04 025 502.8 filed Oct. 27, 2004, which is incorporated herein by reference.

TECHNICAL FIELD

This application relates generally to servicing of a software system landscape, and more particularly to a method for effecting a software service in a system of a software system landscape and to a computer system.

BACKGROUND

Complex software like applicant's SAP R/3 Release 4.5 (SAP) requires customization, e.g. selection of predefined functionality, and adaptation, e.g. addition of or amendment to functionality, as well as other servicing like program and data updates, cf. "SAP System Landscape Optimization" by A. Schneider-Neureither (Ed.), SAP Press, 2004, ISBN 1-59229-026-4, and "SAP R/3 Änderungs-und Transportmanagement" by Metzger and Röhrs, Galileo Press GmbH, Bonn, Germany, $4^{th}$ reprint 2004, ISBN 3-934358-42-X.

Before such servicing may be performed, however, it has to be assured that the customizations, adaptations, program and data updates etc. are free of errors and integrate flawlessly into the software and data environment. In a factory for instance servicing errors are bound to result in costly workflow disruptions due to software malfunction or data corruption. Apart from the servicing side, other use of the software like training of new or inexperienced users may also result in a disruption of the productive system.

Such complex software may therefore be implemented in form of separate logical systems that together form a system landscape. A typical implementation of the aforementioned SAP software for instance may, cf. FIG. 1, comprise a development system 101 for customizing and development work, a quality assurance system 102 for testing functionality using representative test data, a training system 103 for training new users, and several productive systems 104, e.g. each for a different factory, for actual productive use. Other or additional users and systems may be defined according to the particular requirements.

The logical systems are identical in large parts, function autonomously and may be run on a single computer. The quality assurance system 102 for example resembles the productive system 104 in that it provides all the functionality, its present data and additionally special test data. New customization settings or adaptations may thus be thoroughly tested in the quality assurance system 102 without jeopardizing the productive system 104. Likewise, the training system 103 resembles the productive system 104 in that it provides some of the functionality and special test data. A new user using the training system 103 may thus become accustomed to the functionality and observe the effect of his actions, albeit without disturbing the productive system 104.

A transport management system connects the logical systems and serves to forward software services between systems of the system landscape via logical transport paths 105. A service may for example be approved in the development system 101 for export. It will then be forwarded to an input buffer of the quality assurance system 102. Import into the quality assurance system 102 is approved or denied manually by an operator. Thereafter, the software service is forwarded to the quality assurance system 102, and then to the training system 103 and the productive systems 104 where it will be imported following manual approval by an operator.

The operator is in charge of manually effecting the servicing. This requires an analysis of the system landscape layout, of the route that each service takes through the system landscape, project status switches in each system that define the respective system's changeability options, attributes in each service that define properties of the service etc. Import of services and other tasks are performed based on this analysis.

This process is time consuming and bears the risk of errors, in particular in cases that are not part of the routine servicing. In case of a malfunction of a productive system for instance a hot fix or program patch, here referred to as preliminary software service, needs to be implemented quickly. In such a case, only rudimentary testing of the preliminary software service in the development system may be regarded sufficient, so that the preliminary software service need not be imported into all systems but may be routed from the development system straight to the malfunctioning productive system. The operator then needs to analyze the system landscape, decide which systems to log into, which settings of which systems to change, etc.

In addition to the manual consideration of the type of software service and the system landscape layout and configuration, the operator also needs to take care to import services in the correct order, cf. FIG. 2a and FIG. 2b. An original version 201 of the software and data is first modified by a first software service 202, resulting in modified version 203, and subsequently by a second software service 204, resulting in modified version 205, cf. FIG. 2a. However, if the second software service 204 is imported before the first software service 202, the original version 201 is changed into modified version 206 by the second software service 204 and subsequently into modified version 207 by the first software service 202, cf. FIG. 2b. The modified versions 205 and 207 differ and the version 207 will not perform as intended.

In view of the fact that an SAP R/3 implementation may comprise dozens of systems and require thousands of services per month during phases of change, the operator time required becomes considerable as does the risk for errors to occur.

SUMMARY

In one aspect of the invention, a method is provided for effecting a software service in at least one of a plurality of logical systems of a software system landscape, wherein the logical systems are interconnected by logical transport paths, each logical system has associated therewith one of a plurality of system roles and the software service relates to at least one of the code and the data of the at least one system, the method including providing a transport track that defines a route for software services through logical systems in a particular order and specifies one source system, adjacent interconnected systems, and at least one target system; generating a task list in a central task system from the transport track and the system roles, the task list defining tasks for routing a software service from a starting system to the at least one system and for implementing the preliminary software service in the at least one system; and scheduling in a central control system the execution of the tasks stored in the central task system and monitoring task statuses from the central control system.

In a further aspect of the invention, a computer system is provided comprising: a software system landscape comprising a plurality of logical systems that are interconnected by logical transport paths and each have associated therewith one of a plurality of system roles; a transport track that defines a route for software services through logical systems in a particular order and specifies one source system, adjacent interconnected systems, and at least one target system, a software service relating to at least one of the code and the data of at least one system; a central task system; means for generating a task list in the central task system from the transport track and the system roles, the task list defining tasks for routing a software service from a starting system to the at least one system and for implementing the preliminary software service in the at least one system; a central control system; and means for scheduling in the central control system the execution of the tasks stored in the central task system and for monitoring task statuses from the central control system.

In a still further aspect of the invention, a computer program product is provided, the computer program product comprising on a storage medium a computer code that upon execution on a computer system performs the method according to the invention.

Example embodiments of the invention thus provides an automated generation of a task list with all tasks that are required for effecting a software service and a control system for automated scheduling of the tasks and for monitoring their statuses. This effectively provides an automated management of tasks for effecting a software service, be it a regular or a preliminary software service, which considerably reduces the complexity of the process.

BRIEF DESCRIPTION OF THE DRAWINGS

Further embodiments of the invention are inferable from the following description and the claims.

DETAILED DESCRIPTION

Figure 1:
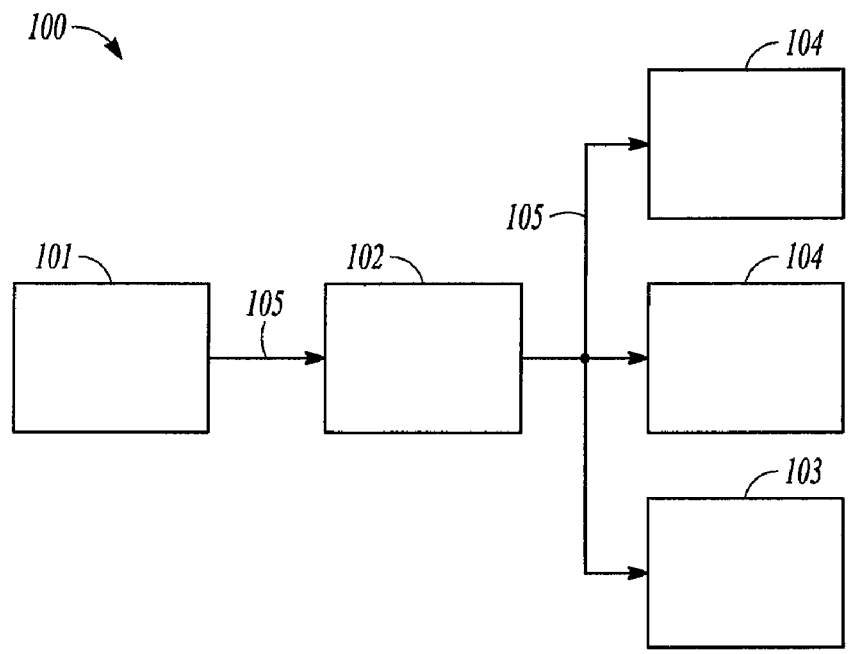
FIG. 1 shows a system landscape of the prior art.
Figure 2A:
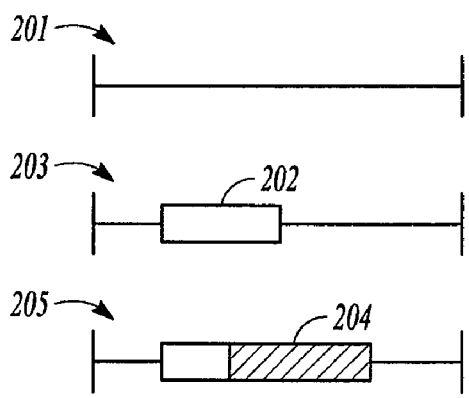
FIGS. 2a and 2b illustrate software services performed in different orders according to the prior art.
Figure 2B:
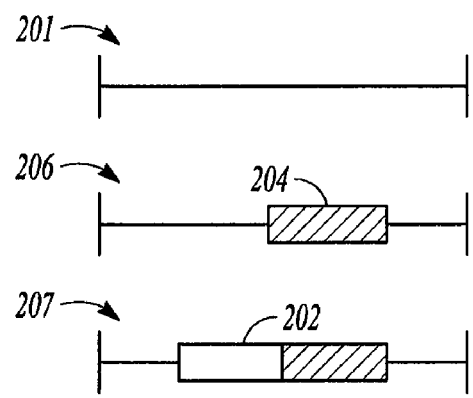
Figure 3:
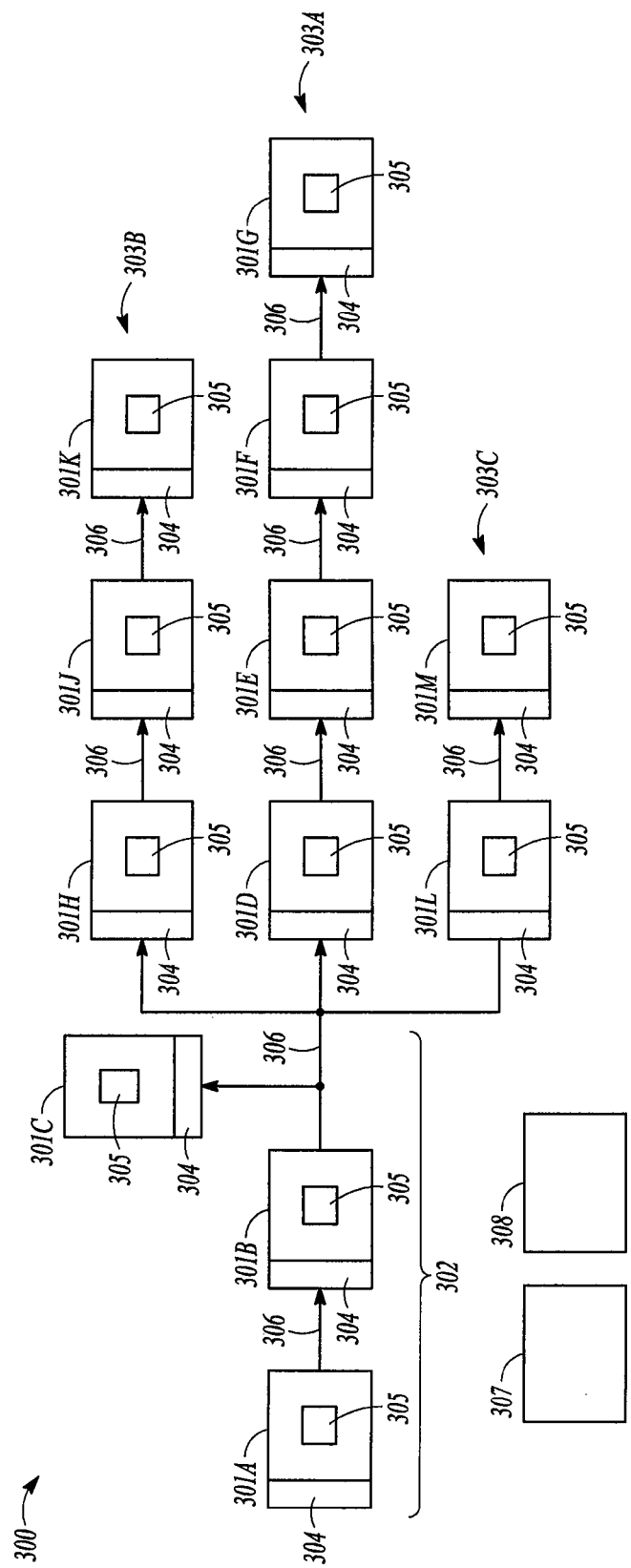
FIG. 3 illustrates a system landscape according to an example embodiment of the invention.

The embodiment shown in FIG. 3 illustrates an SAP R/3 Release 4.5 system landscape 300 with separate logical systems 301 that are here divided into a global part 302, e.g. at a main development and production facility, and local parts 303a, 303b, 303c, e.g. at other production facilities.

The global part 302 comprises at least a development system 301a for customizing and development work, a quality assurance system 301b for testing functionality using representative test data, and a productive system 301c for actual productive use.

The local part 303a comprises a development system 301d for customizing and development work of local adaptations to SAP, e.g. to meet different legal requirements if part 303a is located in a different country than the global part 302. The local part 303a further comprises a quality assurance system 301e for testing functionality using representative test data, a training system 301f for training new users, and a productive system 301g for actual productive use.

The local part 303b comprises a development system 301h, a quality assurance system 301j and a productive system 301k, but no training system. The local part 303c is a two system landscape comprising a development system 301l and a productive system 301m only.

The system landscape may be different according to the actual requirements. Fewer or more, different or differently connected or grouped systems 301 may be defined as needed.

The logical systems 301 are identical in large parts and function autonomously. The quality assurance system 301j for example resembles the productive system 301k in that it provides all the functionality, its present data and additionally special test data. New customization settings or adaptations may thus be thoroughly tested in the quality assurance system 301j without jeopardizing the productive system 301k.

Each system 301 comprises an import buffer 304 for buffering incoming software services and means 305 for communication with a central task system 307 that is connected to a central control system 308. A transport management system connects the logical systems 301 and serves to route software services across the system landscape via logical directional transport paths 306. A service may for example relate to customization of a system 301, e.g. a selection of predefined functionality in the system 301, or an adaptation of a system 301, e.g. an addition of or amendment to functionality, or to program and data updates or hot fixes or patches the like. Transport tracks are provided that each define one or more particular routes for software services along the transport paths through the system landscape. A transport track may for example define the route from system 301a through systems 301b, 301h, 301j to system 301k. Another transport track may define the route from system 301d through systems 301e, 301f to system 301g. Transport tracks with branches may also be provided, e.g. from system 301a to system 301b and then in a first branch to system 301c and in a second branch to systems 301l, 301m. There may be more than one transport track per system landscape, each transport track being assigned to a project context like a development project for the local part 303a only or a documentation project for the global part 302 only etc.

The systems 301 of each part 302, 303a, 303b, 303c and the central task system 307 may be located and simultaneously executed in a single computer, or may be distributed across separate hardware. The global part 302 and the local parts 303a, 303b, 303c may each run on physically separate computer systems, which themselves may comprise different computers.

Figure 4:
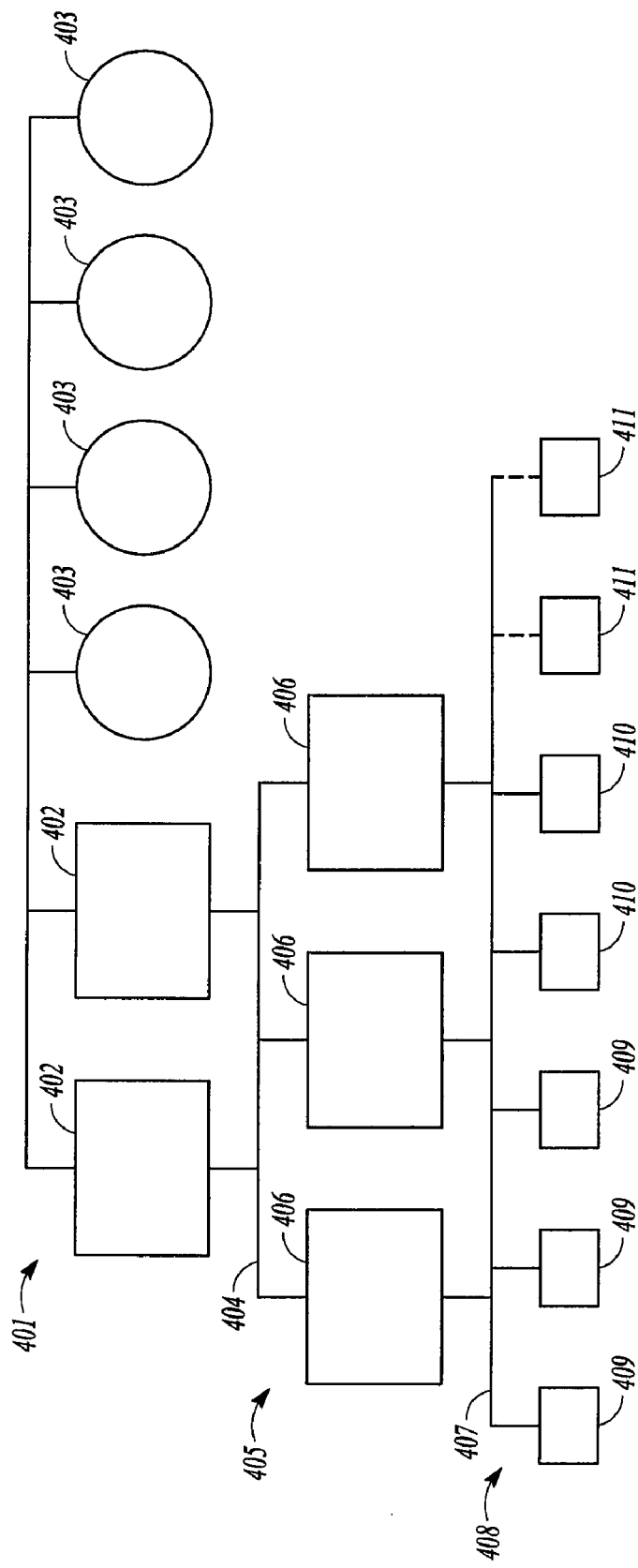
FIG. 4 shows an example embodiment of the hardware of a computer system according to the invention.

An example implementation of the local part 303a may comprise, cf. FIG. 4, a data base layer 401 for storing and retrieving business data like a factory inventory, employee data, sales figures etc. The data base layer 401 comprises one or more data base servers 402 and four data bases 403, one for each of the systems 301d, 301e, 301f and 301g.

Connected to the data base layer 401 by a suitable network 404, e.g. a LAN, is an application layer 405 for execution of the software of the systems 301d, 301e, 301f and 301g. The application layer 405 comprises one or more application servers 406.

Finally, connected to the application layer 405 by a suitable network 407, e.g. a LAN, is a presentation layer 408 for the graphical user interface (GUI). The presentation layer 408 may comprise dumb terminals 409, Personal Computers 410 and/or wireless access devices 411 like PDAs.

Each system 301 has associated therewith a system role which defines the respective system's function within the landscape. The system 301a, 301b and 301c for example, have the roles "development system in the global part", "quality assurance system in the global part" and "productive system in the global part", respectively. The systems 301l and 301m have the roles "development system in the local part 303c" and "productive system in the local part 303c", respectively. The other systems 301 have corresponding roles. In SAP, the system roles are typically defined in the Solution Manager for Implementation.

According to an example embodiment of the invention, system role types are provided. System role types may comprise the following:

D Source systems: A transport request comprising a software service is generated and sometimes tested in a system of this type, usually a development system.

O Follow-on system: A transport request comprising a regular software service imported into a system of this type and then forwarded to at least one next system of the transport track. A transport request comprising a preliminary software service is not imported into a system of this type but instead forwarded.

P Target system: A transport request comprising a software service is imported into a system of this type but not forwarded. Target systems are typically productive systems.

In the embodiment of FIG. 3 the development systems 301a, 301h, 301d and 301l are of system role type D, the productive systems 301c, 301k, 301g and 301m are of system role type P and the systems 301b, 301j, 301e and 301f between the development systems and the productive systems are of the system role type O. Other and/or additional system types may be provided.

Furthermore, at least two software service types are provided. The first type is a regular software service that is generally effected at predefined intervals. Transport requests comprising a software service of this type are collected in the import buffers and imported, tested, forwarded etc. at the time when the regular software service is effected. The second type is a preliminary software service, also called hot fix or patch. This software service needs to be processed immediately in a particular system, generally a malfunctioning productive system, and not necessarily in all systems.

Figure 5:
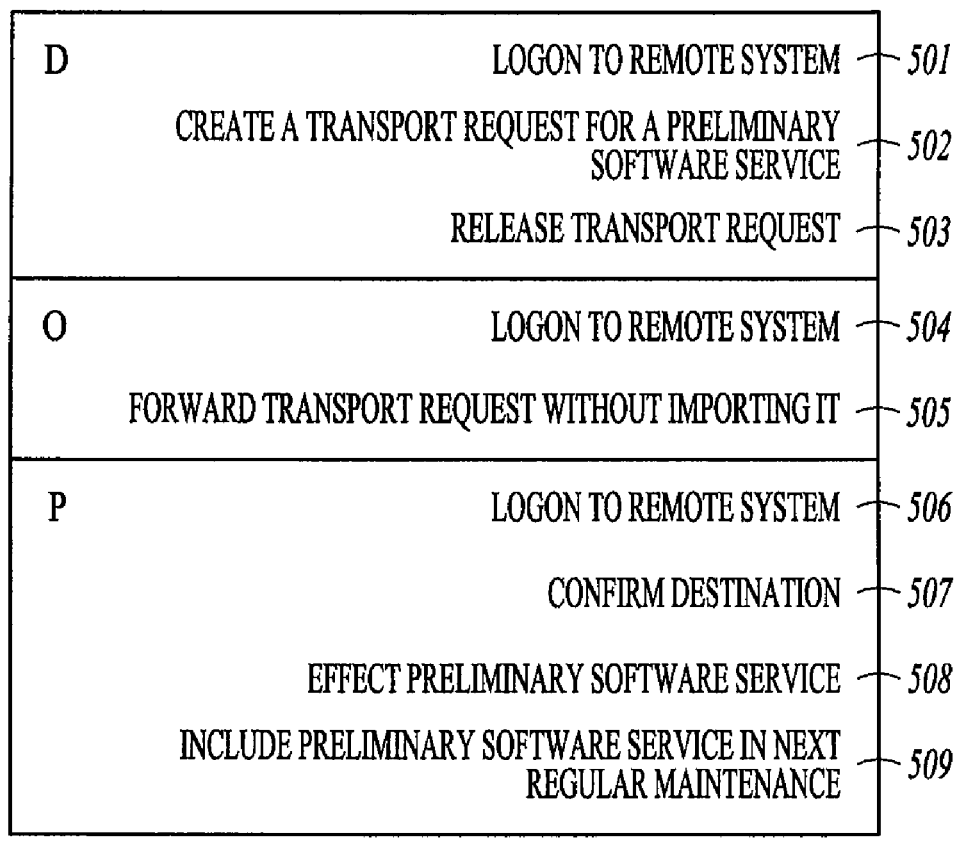
FIG. 5 illustrates tasks associated to system role types.

Tasks are assigned to system role types and software service types. The tasks may be marked as compulsory and may comprise the following exemplary tasks:

for type D: logon to remote system
generate transport request with software service
release transport request for forwarding to one or more systems
for type O: logon to remote system
for regular software service only: import software service
forward transport request
for type P: logon to remote system
import transport request, notify quality management and await release
for preliminary software service only: amend next regular maintenance service to include the imported preliminary software service In the example of FIG. 5 a list 500 contains for the system role type D and a preliminary software service a task 501 to logon to a remote system, a task 502 to create a transport request for a preliminary software service, and a task 503 to release the transport request to the system landscape for forwarding to at least one productive system. For the system role type O the list 500 comprises a task 504 to logon to a remote system and a task 505 to forward transport request without importing it. For the system role type P the list 500 comprises a task 506 to logon to a productive system, a task 507 to confirm that the particular productive system is the destination for the preliminary software service, a task 508 to effect the preliminary software service and a task 509 to amend a next regular maintenance service to include the imported preliminary software service. Other and/or additional tasks as well as attributes like "compulsory" may be provided. For example, a task to first import software services that are already queued in the import buffer but would only be imported during the next regular service, a task to check certain system properties, a task to check the interdependencies of software services in the buffer and to reorder them to avoid mutual overwriting, etc.

Based on the type and the destination(s) of the software service, on the transport tracks, the system role types and the list 500 or a corresponding list for a regular software service, a task list is automatically generated in the central task system 307. The task list contains all tasks that are required to effect the software service in the destination productive system(s).

The task list has a hierarchical structure. The top level contains one entry per transport track. The next level contains one entry per system role type, even in case that no system of corresponding type is defined. The next level contains one entry per system role, only if this role is used by a system. The lowest level contains the tasks for each system.

Figure 6:
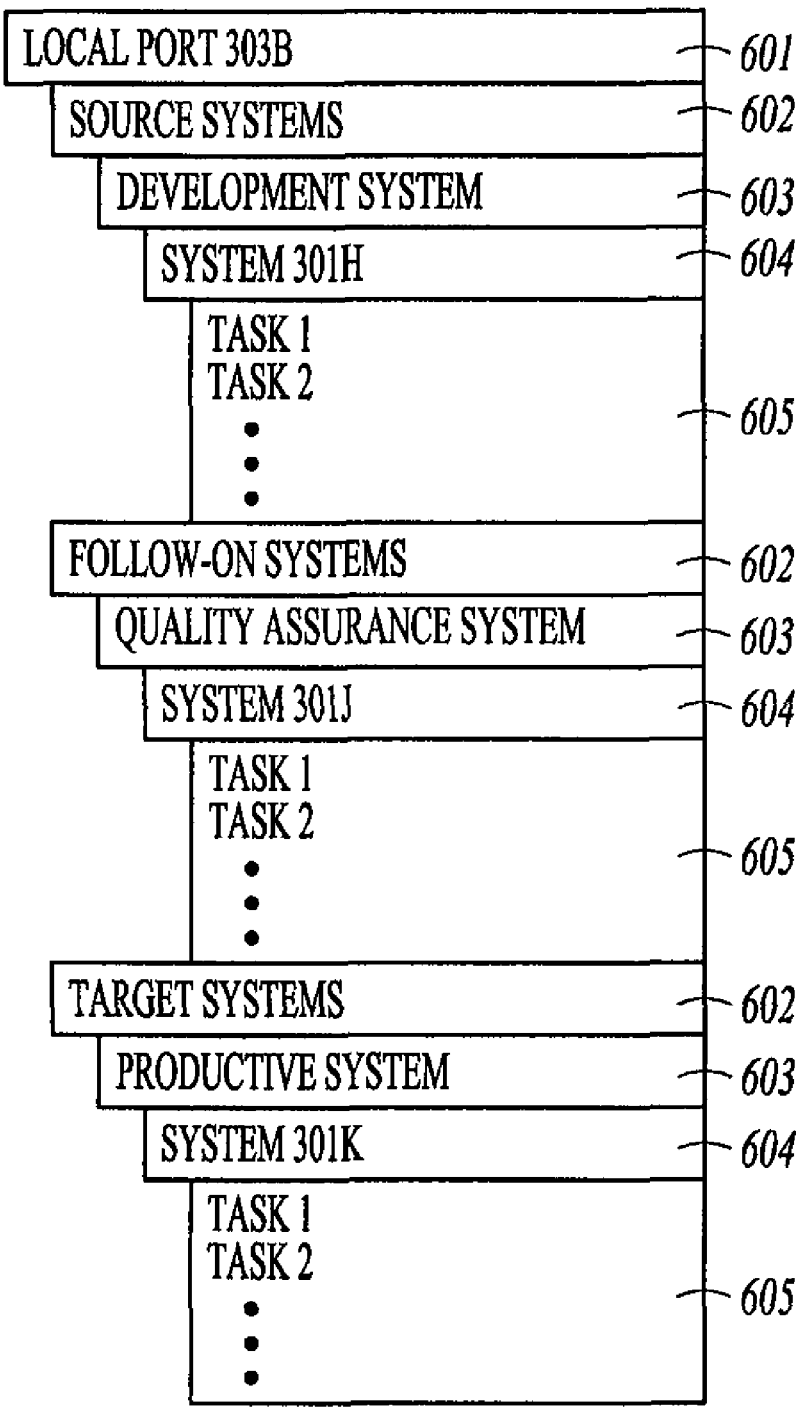
FIG. 6 illustrates task list.

An exemplary task list 600 is illustrated in FIG. 6 and has here a structure that is hierarchically grouped according to transport track 601, system role types 602, system roles 603, systems 604 and finally tasks 605. The tasks are associated to particular systems. The grouping allows to block and unblock groups of tasks.

Execution of the tasks of a task list is scheduled by the central control system 308. The central control system 308 contains for this purpose a schedule that is automatically generated according to the tasks of the task list. The generation of the schedule involves analyzing the type of each task and other system information and accordingly compiling predefined schedule elements to form the schedule. The predefined schedule elements comprise responsibilities, e.g. assign certain types of tasks for certain systems to particular persons or groups of persons.

For example, the schedule may be assembled to comprise the following elements with responsibilities: create task list for regular software service—change manager; import into quality assurance system—operator; take over for testing and describe test results—tester; approve or reject—quality manager; if approved: import into productive system—operator; if not approved: notify developer—tester.

The central control system 308 is thus suited to completely manage all service and preliminary service related processes from the reporting of a possible malfunction to the final implementation of the correction in the productive system.

The central control system 308 allows a user to display, manage, analyze and document the tasks and any related activity and also to trigger execution of the tasks in the central task system 307. For that purpose, the tasks may provide spool lists, statuses, application logs, job logs etc. to the central control system 308.

According to the method of an example embodiment of the invention, system roles and system role types are provided, the systems of the system landscape being associated to the system roles, and a list of tasks associated to system role types is provided. At least one transport track is provided that defines a route for transport requests through systems in a particular order and specifies one source system, adjacent interconnected systems, and at least one end or target system.

A task list is generated from the software service type, the system role types, the list and the transport tracks, and defines tasks for effecting the software service. This involves analyzing the transport tracks to identify the systems that need to be passed, analyzing them to identify their system roles, analyzing the system roles to identify their type, and compiling tasks for the affected systems according to the list. A schedule is also compiled in the central control system according to the tasks in the task list. The central control system then triggers execution of the tasks by particular persons or a group of persons according to authorization levels, and monitors the status of the tasks. The complex process of manual analysis and action of the prior art is thus replaced by an automated centrally managed structured schedule.

Although the foregoing has been a description of an example embodiment of the invention, it will be apparent to those skilled in the art upon review of this disclosure that numerous variations and modifications may be made in the invention. For example, instead of using SAP R/3 Release 4.5, other SAP and non-SAP systems may benefit from the invention.

What is claimed is:

1. A method of effecting a software service, the method comprising:
   in at least one of a plurality of logical systems of a software system landscape, the logical systems being interconnected by logical transport paths, each logical system having associated therewith one of a plurality of system roles and the software service relating to at least one of the code and the data of the at least one system, the method including:
      providing system role types, each of the system role types comprising a group of system roles, the system role types including source systems, follow-on systems, and target systems, the follow-on systems including at least one of a training system, a testing system, and a quality assurance system;
      providing a transport track that defines a route for the software service through logical systems in a particular order and specifies one source system, at least one of the follow-on systems, and at least one target system;
      generating a task list in a central task system from the transport track and the system roles, the task list defining tasks for routing the software service from a starting system to the at least one system and for implementing a preliminary software service in the at least one system, the task list having hierarchy levels, the hierarchy levels including a transport track level, a system role type level below the transport track level, a system role level below the system role type level, a system level below the system role level, and a task level below the system level; and
      scheduling in a central control system the execution of the tasks stored in the central task system and monitoring task statuses from the central control system.

2. The method of claim 1, wherein the scheduling comprises generating a schedule using predefined schedules for tasks and software service types.

3. The method of claim 1, wherein generating the task list comprises determining from the transport track which systems are affected, determining the system role type of each affected system, determining the software service type, and using predefined tasks associated to system role types and software service types.

4. The method of claim 3, wherein a preliminary software service type and a regular software service type are used as the software service types.

5. A computer system comprising:
   a software system landscape comprising a plurality of logical systems that are interconnected by logical transport paths and each having associated therewith one of a plurality of system role types, the system role types comprising a group of system roles, the system role types including source systems, follow-on systems, and target systems, the follow-on systems including at least one of a training system, a testing system, and a quality assurance system;
   a transport track that defines a route for the software service through logical systems in a particular order and specifies one source system, at least one of the follow-on systems, and at least one target system, the software service relating to at least one of the code and the data of at least one system;
   a central task system;
   means for generating a task list in the central task system from the transport track and the system roles, the task list defining tasks for routing a software service from a starting system to the at least one system and for implementing a preliminary software service in the at least one system, the task list having hierarchy levels, the hierarchy levels including a transport track level, a system role type level below the transport track level, a system role level below the system role type level, a system level below the system role level, and a task level below the system level;
   a central control system; and
   means for scheduling in the central control system the execution of the tasks stored in the central task system and for monitoring task statuses from the central control system.

6. The system of claim 5, wherein predefined schedules for tasks and software service types are provided for use by the scheduling means.

7. The system of claim 5, wherein the means for generating are designed to determine from the transport track which systems are affected, to determine the system role type of each affected system, to determine the software service type, and to use predefined tasks associated to system role types and software service types.

8. The system of claim 7, wherein a preliminary software service type and a regular software service type are provided.

9. A non-transitory computer-readable storage medium containing instructions that, when executed by one or more processors, perform a method of effecting a software service, the method comprising:
   in at least one of a plurality of logical systems of a software system landscape, the logical systems being interconnected by logical transport paths, each logical system having associated therewith one of a plurality of system roles and the software service relates relating to at least one of the code and the data of the at least one system, the method including:
      providing system role types, each of the system role types comprising a group of system roles, the system role types including source systems, follow-on systems, and target systems, the follow-on systems including at least one of a training system, a testing system, and a quality assurance system;
      providing a transport track that defines a route for the software services through logical systems in a particular order and specifies one source system, at least one of the follow-on systems and at least one target system;

generating a task list in a central task system from the transport track and the system roles, the task list defining tasks for routing the software service from a starting system to the at least one system and for implementing a preliminary software service in the at least one system, the task list having hierarchy levels, the hierarchy levels including a transport track level, a system role type level below the transport track level, a system role level below the system role type level, a system level below the system role level, and a task level below the system level; and scheduling in a central control system the execution of the tasks stored in the central task system and monitoring task statuses from the central control system.

10. A computer system comprising:

a software system landscape comprising a plurality of logical systems that are interconnected by logical transport paths and each having associated therewith one of a plurality of system role types, the system role types comprising a group of system roles, the system role types including source systems, follow-on systems, and target systems, the follow-on systems including at least one of a training system, a testing system, and a quality assurance system;

a transport track that defines a route for software service through logical systems in a particular order and specifies one source system, at least one of the follow-on systems, and at least one target system, the software service relating to at least one of the code and the data of at least one system;

a central task system;

a module, having one or more processors, to generate a task list in the central task system from the transport track and the system roles, the task list defining tasks for routing the software service from a starting system to the at least one system and to implement a preliminary software service in the at least one system, the task list having hierarchy levels, the hierarchy levels including a transport track level, a system role type level below the transport track level, a system role level below the system role type level, a system level below the system role level, and a task level below the system level;

a central control system; and a module to schedule in the central control system the execution of the tasks stored in the central task system and to module task statuses from the central control system.

* * * * *